United States Patent [19]

Peters

[11] 4,239,058

[45] Dec. 16, 1980

[54] PULL TYPE RELAY VALVE WITH AUTOMATIC LOCKOUT

[75] Inventor: Clifford M. Peters, Longview, Tex.

[73] Assignee: ACF Industries, Incorporated, New York, N.Y.

[21] Appl. No.: 57,911

[22] Filed: Jul. 16, 1979

[51] Int. Cl.³ .................... F15B 13/042; F16K 37/00
[52] U.S. Cl. .................................. 137/557; 137/458; 137/625.66; 251/63
[58] Field of Search .................. 137/458, 557, 625.66; 251/63

[56] References Cited

U.S. PATENT DOCUMENTS

| 3,877,484 | 4/1975 | Theriot et al. | 137/625.66 |
| 4,121,615 | 10/1978 | Bergeron | 137/625.66 X |

*Primary Examiner*—Gerald A. Michalsky
*Attorney, Agent, or Firm*—Stephen T. Belsheim

[57] ABSTRACT

A manually set relay valve for controlling fluid flow to and from a valve actuator. A slide valve (60) is manually pulled outwardly to the set or open position and held therein by pilot pressure applied to a piston chamber (46) through a passage (104) in the slide valve. When the slide valve is tripped to the closed position due to an interruption of pilot pressure, a cross port (106) of the fluid passage vents the piston chamber to maintain the relay closed until manually reset.

15 Claims, 9 Drawing Figures

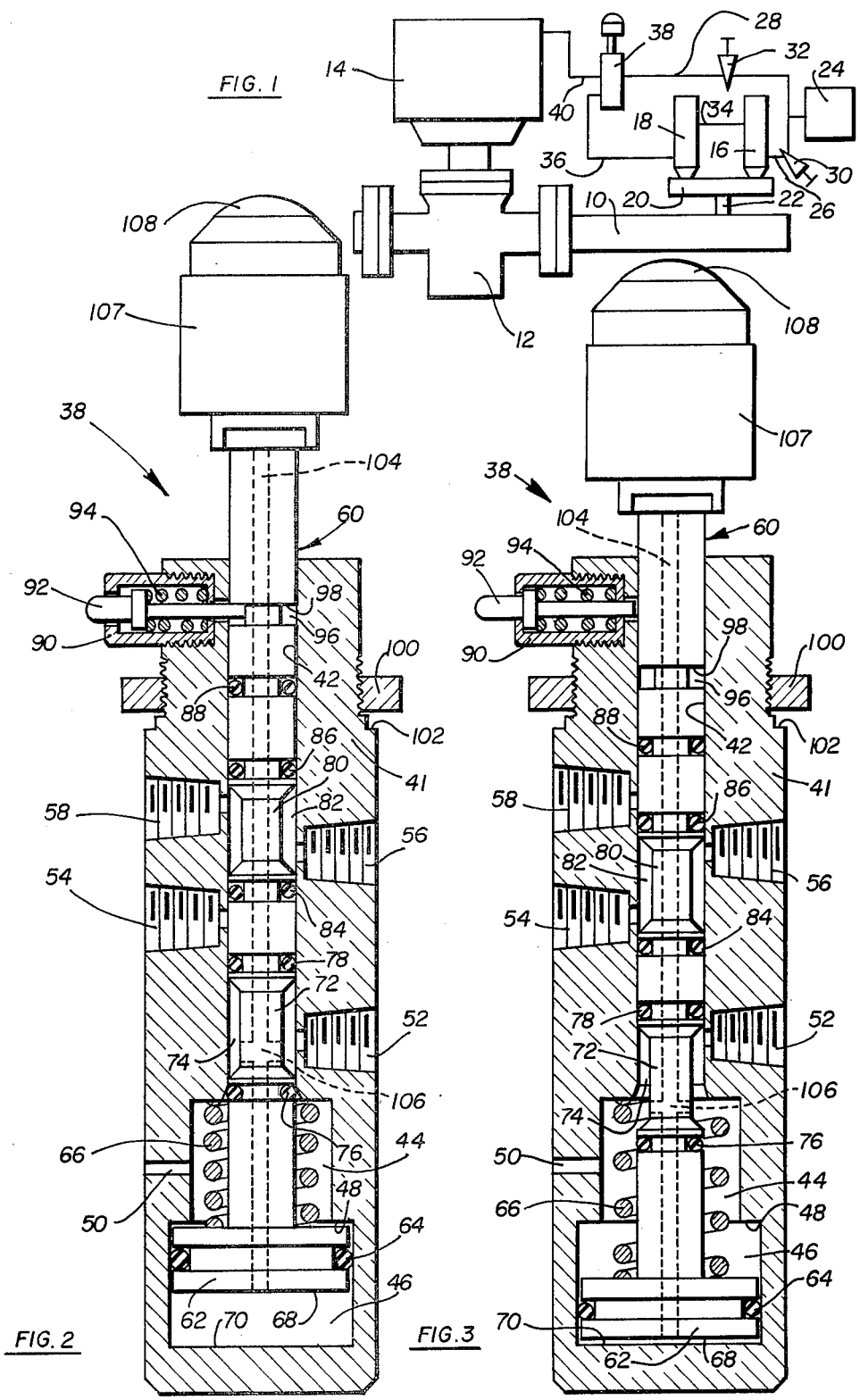

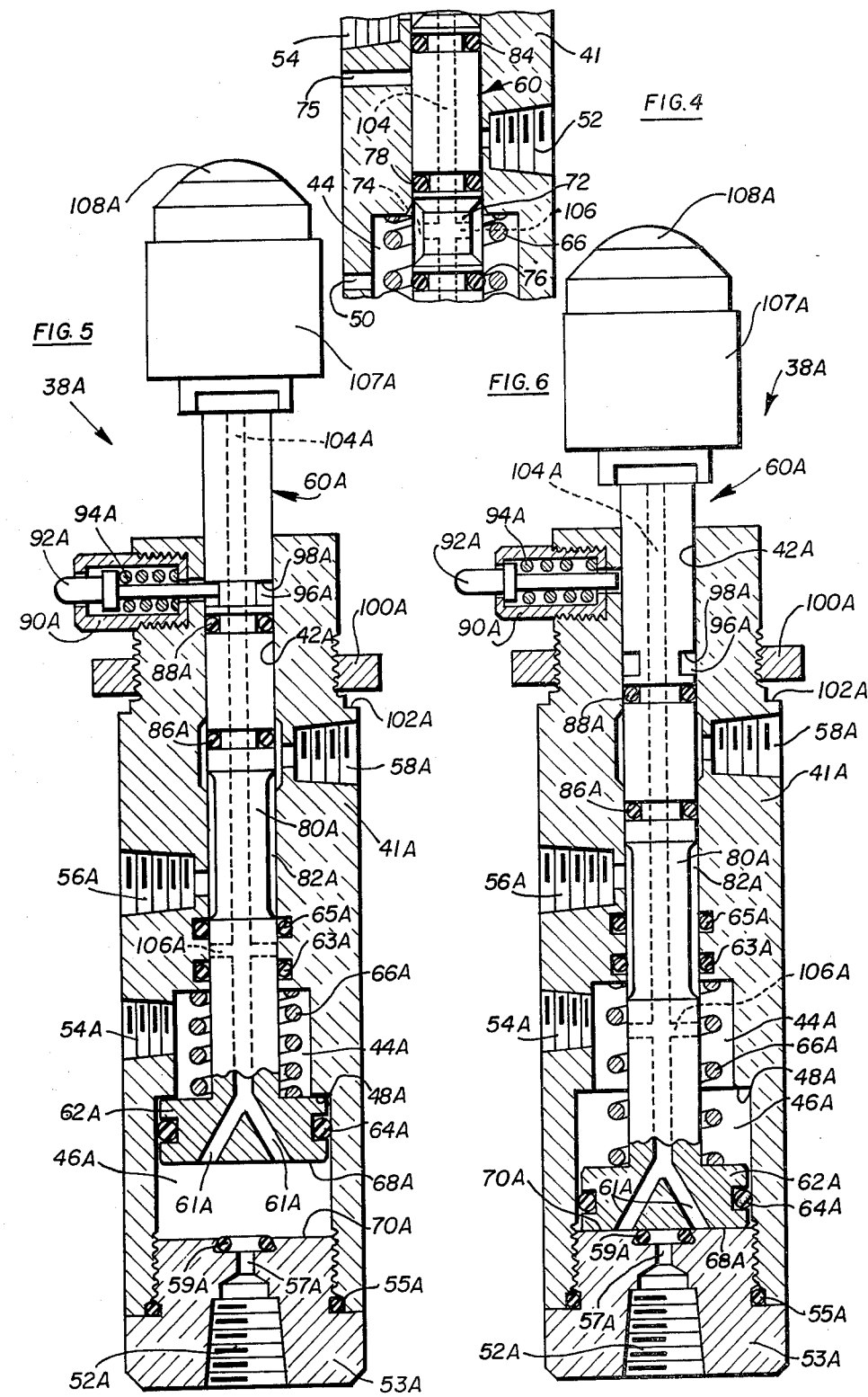

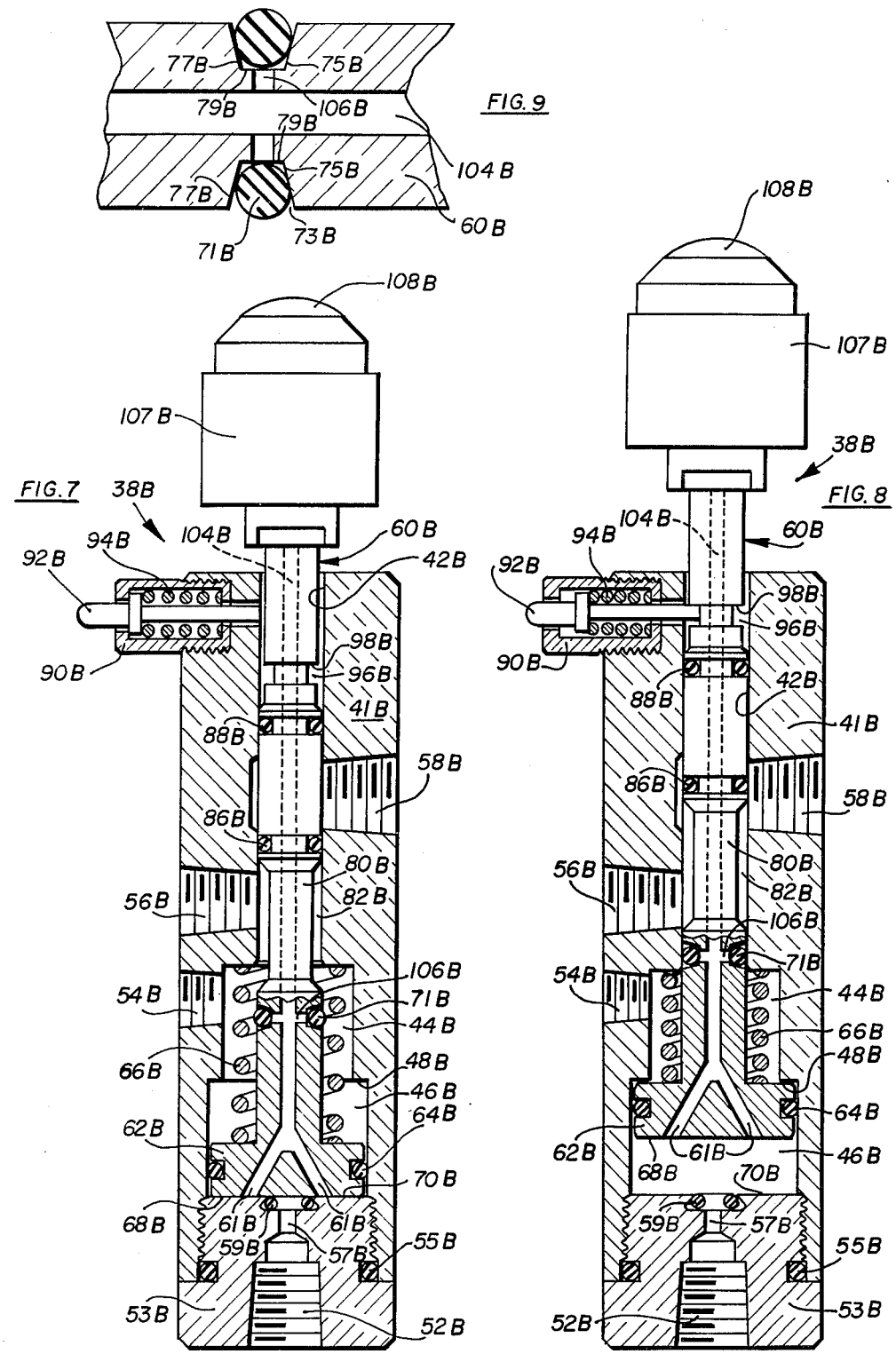

4,239,058

PULL TYPE RELAY VALVE WITH AUTOMATIC LOCKOUT

BACKGROUND OF THE INVENTION

This invention relates to manually set relay valves of the type used in fluid control systems such as safety systems for oil and gas wells.

Safety systems of this type act to shut-in well production lines and other flowlines in the event of unusually high or low pressure conditions. A pilot operated relay valve is typically included in the safety system to control fluid flow to and from the fluid actuator of a gate valve which opens and closes the flowline. In normal operation, the relay is held open by fluid pressure applied by pilots which sense the flowline pressure. When the pressure in the flowline is outside of the operating range of the safety system, the pilot pressure to the relay is interrupted and the relay closes. Fluid is then bled from the actuator to effect closing of the gate valve. The relay must be manually reset to the open position after the problem which caused the abnormal pressure has been corrected.

In order to assure that a resumption of pilot pressure will not reset the relay, various types of valve constructions have been proposed to achieve automatic lockout of the slide valve which forms the valve element of the relay. Manual resetting is thus necessary before the flowline can be opened following closing of the gate valve, and the problem can be identified and corrected without the possibility of it going undetected. The automatic lockout arrangements which have been proposed in the past, such as those shown in U.S. Pat. Nos. 3,877,484, 4,094,340, and 4,145,025, are less than satisfactory in a number of respects, most notably in their complexity and lack of reliability. Difficulties in proper functioning of such devices can arise in the event of seal leakage, which is not at all uncommon with O-rings and similar seal elements, particularly after the valve has been used extensively.

The relays which have been used in the past have usually been pull type valves in which a knob on the slide valve is pulled outwardly for resetting, although push type valves have also been proposed. Existing pull type relays have a pilot port in the inner end of the valve body which creates problems with respect to automatic lockout due to the application of pilot pressure directly against the piston of the slide valve, thereby tending to unseat the slide valve when pilot pressure resumes after having been interrupted. Relays have also been provided with visual indicators which display their condition, as disclosed in U.S. Pat. Nos. 4,121,615 and 4,137,942.

SUMMARY OF THE INVENTION

In accordance with the present invention, a pilot operated relay includes a slide valve having a knob on its outer end which may be pulled to set the slide valve in the open position wherein pressurized fluid is directed to a gate valve actuator. Pilot pressure acts against a piston of the slide valve to hold it open, and a spring is provided to close the slide valve in the event of interruption of the pilot pressure. In a first form of the invention, a fluid passage formed in the slide valve has a cross port which communicates with the pilot line in the open position of the slide valve to direct fluid into the passage and to the inner end of the piston for holding the slide valve open. When the slide valve is in the closed position, the cross port is in direct fluid communication with a vent port to assure that a resumption of pilot pressure cannot shift the slide valve to the open position.

A second embodiment of the invention differs from the first in that the pilot pressure is applied directly to the piston through a pilot port formed in the inner end of the valve body. A fluid passage extending longitudinally through the slide valve has a cross port which communicates with a bleed port in the closed position of the slide valve, so that pilot pressure is bled through the fluid passage and cross port to the bleed port in order to achieve automatic lockout of the relay. The cross port is sealed between a pair of O-rings when the slide valve is set in the open position.

A third embodiment of the invention is similar to the second embodiment, except that the cross port of the fluid passage carries an O-ring which serves as a check valve. With the slide valve closed, fluid applied to the pilot port due to a resumption of pilot pressure is bled into the fluid passage and out past the O-ring to the bleed port, thereby assuring lockout of the relay. In the open position of the slide valve, the O-ring is confined by the bore of the valve and provides a fluid-tight seal for the cross port. Each emobodiment of the invention includes a visual indicator on the knob of the slide valve which is actuated by application of pressure to the fluid passage.

DETAILED DESCRIPTION OF THE INVENTION

In the accompanying drawings which form a part of the specification and are to be read in conjunction therewith:

FIG. 1 is a diagrammatic view showing a fluid controlled safety system which includes a pilot operated relay valve constructed in accordance with the present invention;

FIG. 2 is a sectional view of a relay valve constructed according to a first embodiment of the present invention, with the valve in its open or unseated position;

FIG. 3 is a sectional view similar to FIG. 2, but showing the relay valve in its closed or seated position;

FIG. 4 is a fragmentary sectional view showing a modified relay valve having an alternative lockout arrangement for the slide valve;

FIG. 5 is a sectional view of a relay valve constructed according to a second embodiment of the present invention, with the valve in its open or unseated position;

FIG. 6 is a sectional view similar to FIG. 5 but showing the valve in its closed or seated position;

FIG. 7 is a sectional view of a relay valve constructed according to a third embodiment of the present invention, with the valve in its closed or seated position;

FIG. 8 is a sectional view similar to FIG. 7 but showing the valve in its open or unseated position; and FIG. 9 is a fragmentary sectional view on an enlarged scale showing the O-ring check valve included in the relay of FIGS. 7 and 8.

Referring initially to FIG. 1, a fluid operated safety system is used to control the fluid flow through a main flowline 10 which is typically the production line of an oil or gas well. Line 10 is equipped with a surface safety valve in the form of a conventional gate valve 12 which may be opened and closed to open and close line 10. A hydraulic or pneumatic actuator 14 is mounted to valve 12 and acts to maintain valve 12 in the open position when pressurized fluid is applied to the actuator. When fluid is bled from actuator 14, a spring or the like (not shown) moves valve 12 to the closed position to shut-in the flowline 10.

The pressure in line 10 is sensed by pressure sensitive pilots in the form of a high pressure pilot 16 and a low pressure pilot 18. Pilots 16 and 18 are arranged in series with one another and are mounted on a manifold 20 which applies the flowline pressure to the pilots. A short conduit 22 connects manifold 20 with line 10. A fluid source 24, which is typically a pressurized cylinder of gas or hydraulic fluid, applies pressurized fluid to a pair of lines 26 and 28 which may be maintained at different pressures by respective pressure regulators 30 and 32. Line 26 leads to the inlet of high pilot 16, while another line 34 extends from the outlet of pilot 16 to the inlet of low pressure pilot 18. Line 36 serves as a pilot line which extends from the outlet of low pilot 18 to a pilot port of a relay valve 38 constructed in accordance with a first embodiment of the present invention. Line 28 leads to the inlet or supply port of relay 38 and communicates with an outlet line 40 when relay valve 38 is open, as will be more fully explained. Line 40 leads to actuator 14 in order to apply pressurized fluid thereto for holding of gate valve 12 in the open position.

High pilot 16 is set to trip to its closed position if the pressure in line 10 exceeds a predetermined high pressure level corresponding to the setting of the high pilot. Conversely, low pilot 18 is set to trip to its closed position when the pressure in line 10 is below a predetermined low pressure level corresponding to the setting of the low pilot. An operating pressure range of the safety system is thus defined between the low pressure setting of pilot 18 and the high pressure setting of pilot 16. When the flowline pressure is within the operating range of the system, pilot fluid from source 24 is directed through pilots 16 and 18 to line 36 where it acts to maintain relay 38 in its open position. Consequently, actuator fluid from source 24 passes through line 28, relay 38, and line 40 to actuator 14 in order to maintain valve 12 in the open position. If the pressure in line 10 drops below the setting of pilot 18 or rises above the setting of pilot 16, the pilot flow from line 26 to line 36 is interrupted and relay 38 closes to bleed fluid from actuator 14. In this manner, valve 12 is closed to shut-in the flowline when the pressure is outside of the operating range of the safety system.

Referring now to the details of relay 38, FIGS. 2 and 3 show the relay in its respective open and closed positions. Relay 38 includes a cylindrical valve body 41 having a cylindrical longitudinal bore 42. Bore 42 extends into body 41 from the outer end thereof and has a first enlarged portion 44 near the inner end of the valve body. Immediately inwardly of portion 44 is another enlarged bore portion which defines a cylindrical piston chamber 46 near the inner end of valve body 41. An annular shoulder 48 is presented at the intersection of bore portion 44 with piston chamber 46. A vent 50 is formed in the side of valve body 41 and connects with enlarged bore portion 44.

At a location outwardly of bore portion 44, the side of valve body 41 is provided with a pilot port 52 which connects with pilot line 36. A bleed port 54 is formed in the side of body 41 at a location outwardly of pilot port 52. An outlet or actuator port 56 is formed in the side of body 41 at a location outwardly of bleed port 54. Port 56 is connected with actuator line 40. A supply port 58 is formed in the side of body 41 at a location outwardly of actuator port 56. Supply port 58 connects with line 28. Each port 52-58 is reduced in size at its inner end and connects with bore 42.

An elongate slide valve 60 is received in bore 52 for longitudinal sliding movement therein. Slide valve 60 forms the valve element of relay 38 and carries an enlarged piston 62 on its inner end. Piston 62 is located in piston chamber 46 and is sealed to the wall thereof by an O-ring 64 carried in an annular groove formed on the periphery of the piston. A compression spring 66 is located in bore portion 44 and acts against piston 62 in a manner to continuously urge slide valve 60 inwardly toward the closed or seated position thereof shown in FIG. 3. Piston 62 has a flat pressure face 68 which faces inwardly and which seats against a flat internal surface 70 of body 41 when the slide valve is in the closed position. When slide valve 60 is set in the unseated or open position thereof shown in FIG. 2, piston 62 contacts shoulder 48 to limit the outward movement of slide valve 60.

Slide valve 60 is reduced in diameter to provide a reduced diameter portion 72 located outwardly of piston 62. An annular chamber 74 is defined about reduced diameter portion 72. A pair of O-rings 76 and 78 are carried in annular grooves formed in slide valve 60 at locations on opposite sides of reduced diameter portion 72. Another reduced diameter portion 80 is formed on slide valve 60 at a location outwardly of portion 72. An annular chamber 82 is presented in bore 42 about reduced diameter portion 80. A pair of O-rings 84 and 86 are carried in annular grooves formed in slide valve 60 at locations on opposite sides of reduced diameter portion 80. Another O-ring 88 is carried on slide valve 60 at a location outwardly of O-ring 86.

Slide valve 60 may be temporarily latched in the open position by a detent mechanism which includes a hollow sleeve fitting 90 threaded into the side of valve body 41 near the outer end thereof. A plunger 92 is slidably received in sleeve fitting 90. Plunger 92 is urged outwardly by a compression spring 94. Plunger 92 has an outer end which projects out of fitting 90 and an inner end which is small enough to enter an annular groove 96 formed in slide valve 60. A shoulder 98 of groove 96 contacts the inner end of plunger 92 and, in cooperation with spring 66, provides frictional contact which holds slide valve 60 in the open position shown in FIG. 2 during buildup of pressure in piston chamber 46. When the fluid pressure has built up sufficiently in the piston chamber to overcome the force of spring 66, plunger 92 is released from its frictional contact with shoulder 98 and is pushed outwardly by spring 94 to the position shown in FIG. 3.

In order to mount relay valve 38 to a panel or the like (not shown), a nut 100 is threaded onto valve body 41. The panel to which the relay is mounted is located between nut 100 and a flat shoulder 102 formed on valve body 41.

A fluid passage 104 extends longitudinally through slide valve 60. Passage 104 leads to pressure face 68 of piston 62 and is provided with a cross port 106 at a location intermediate the length of the passage. Cross port 106 serves as an inlet port for delivering fluid to passage 104 and is located in reduced diameter portion 72 between O-rings 76 and 78 in communication with annular chamber 74.

A handle or knob 107 is mounted on the outer end of slide valve 60 at a location outwardly of valve body 41. Knob 107 is provided with a visual indicator device identical to that disclosed in U.S. Pat. No. 4,137,942 to Hargraves et al which is incorporated herein by reference as to the details of the visual indicator. As explained in the aforementioned patent, knob 107 has a lens 108 through which a color such as green is visible to indicate the open position of slide valve 60. A contrasting color such as red is visible through lens 108 to indicate the closed position of slide valve 60. The green color is displayed when passage 104 is exposed to fluid pressure above a predetermined level, while a spring (not shown) of the indicator mechanism effects the red condition of the indicator when the fluid pressure in passage 104 is below a level sufficient to overcome the spring force.

The safety system shown in FIG. 1 is placed in service by setting relay valve 38 in the open position. This is accomplished by pulling outwardly on knob 107 to pull slide valve 60 outwardly to the position shown in FIG. 2. Plunger 92 is then pressed inwardly to temporarily maintain the slide valve in the open position while the pressure builds up downstream of gate valve 12. With relay 38 set in the open position, the fluid in line 28 is able to flow into annular chamber 82 through supply port 58 and from chamber 82 to line 40 through actuator port 56. Pressurized fluid is thus supplied to actuator 14 in order to open gate valve 12. O-rings 84 and 86 confine the fluid to chamber 82 and thus seal bleed port 54 from the actuator fluid.

Once gate valve 12 has opened, the pressure in line 10 builds up and eventually rises above the setting of low pilot 18 so that both pilots 16 and 18 are open to apply pilot fluid to line 36 and pilot port 52 of relay valve 38. The pilot fluid is delivered to annular chamber 74 and enters fluid passage 104 through cross port 106. Passage 104 directs the fluid into piston chamber 46 and also to the visual indicator device in knob 107 in order to display the green condition of the indicator. Once the fluid pressure in piston chamber 46 has built up sufficiently, the pressure shifts slide valve 60 outwardly far enough to release the frictional engagement of plunger 92 with shoulder 98. Spring 94 then pushes plunger 92 outwardly to automatically release the detent mechanism. The fluid pressure in piston chamber 46 thereafter acts against pressure face 68 of piston 62 to maintain slide valve 60 in the open position. Due to the seals provided in bore 42 by O-rings 76 and 78, the incoming pilot pressure is confined to chamber 74, cross port 106, fluid passage 104, piston chamber 46, and the visual indicator located in knob 107.

Relay valve 38 remains in the open position to maintain valve 12 open so long as the pressure in flowline 10 is within the operating range of the safety system as determined by the settings of pilots 16 and 18. However, if the pressure in line 10 rises above the setting of high pilot 16 or drops below the setting of low pilot 18, the appropriate pilot 16 or 18 closes to interrupt fluid flow to line 36 and bleed fluid from line 36. The resulting pressure drop at pilot port 52 permits spring 66 to push slide valve 60 inwardly to the closed position of FIG. 3. In this position, O-ring 86 provides a seal between ports 56 and 58, while ports 54 and 56 communicate through chamber 82 in order to bleed fluid from actuator 14 and thereby effect closing of the gate valve 12.

If the pressure at pilot port 52 should resume for any reason, the pilot pressure is directly vented to vent 50 through chamber 74 and bore portion 44, and the pressure cannot reach piston chamber 46. Consequently, relay valve 38 is automatically locked in the closed position and can be reset to the open position only by manually pulling slide valve 60 outwardly. In the closed position of the slide valve, cross port 106 is located in enlarged bore portion 44 in direct fluid communication with vent 50. Therefore, any fluid in piston chamber 46 inwardly of pressure face 68 is vented, and an additional safety feature is thus provided to assure that valve 38 is locked in the closed position even if there is leakage past one or more seal elements. Since the pressure in fluid passage 104 is exhausted in the closed position of the slide valve, the visual indicator mechanism in knob 107 displays the red color through lens 108 to indicate an abnormal condition of the safety system.

FIG. 4 illustrates a modified arrangement in which O-ring 78 is moved inwardly toward O-ring 76 to reduce the length of reduced diameter portion 72 and annular chamber 74. A vent 75 is formed in the side of body 41 at a location between ports 52 and 54. The modified relay of FIG. 4 functions in the same manner as described previously. In the open position of slide valve 60, O-ring 78 is positioned between pilot port 52 and vent 75 to prevent venting of the pilot fluid. In the closed position of the slide valve shown in FIG. 4, O-ring 78 is located between port 52 and bore portion 44 so that vent 75 exhausts pilot fluid if the pilot pressure should resume following interruption thereof. Again, cross port 106 is located in bore portion 44 in direct fluid communication with vent 50 to assure that piston chamber 46 is vented in the closed position of the slide valve.

FIGS. 5 and 6 illustrate a second embodiment of the invention which is directed to a relay valve generally designated by reference numeral 38A. Relay valve 38A is similar to valve 38 in most respects, and the components which are similar in the two embodiments are identified by the same reference numerals, with the letter "A" following each of the numerals used in FIGS. 5 and 6. The respects in which the second embodiment differs from the first embodiment will now be described.

Referring to FIGS. 5 and 6, pilot port 52A is formed in an inner end cap 53A which is threaded onto the inner end of valve body 41A and sealed thereto by an O-ring 55A. Pilot port 52A leads to a restricted passage 57A which connects with piston chamber 46A. A small O-ring 59A seals against face 68A of piston 62A in the closed position of the slide valve. Therefore, only the small area of the piston within O-ring 59A is exposed to pilot pressure when the slide valve is closed. It is pointed out that pilot fluid is applied to piston chamber 46A at the inner end thereof rather than through the piston as in the first embodiment.

Passage 104A has a pair of angled inlet passageways 61A which lead to pressure face 68A of piston 62A. When slide valve 60A is in the closed position of FIG. 6, the open ends of passageways 61A are located outwardly of O-ring 59A so that passage 104A is effectively sealed from pilot port 52A. Cross port 106A of passage 104A is located such that in the open position of slide valve 60A, cross port 106A is located between a pair of O-rings 63A and 65A which are mounted in spaced apart annular grooves formed in the walls of bore 42A. O-rings 63A and 65A provide seals between valve body 41A and slide valve 60A such that cross port 106A is blanked off in the open position of the slide valve. O-rings 63A and 65A are substituted for O-rings 76 and 78 of the first embodiment.

Exhaust or bleed port 54A intersects with enlarged bore portion 44A, and vent 50 is thus eliminated in the embodiment of FIGS. 5 and 6. Reduced diameter portion 72 and annular chamber 74 are also eliminated, while annular chamber 82 is elongated somewhat such that it extends between actuator port 56A and enlarged bore portion 44A in the closed position of slide valve 60A. Chamber 82A thus provides a fluid path past O-rings 63A and 65A in the closed position of the slide valve. Although there are additional minor modifications of the relay 38A shown in FIGS. 5 and 6, such modifications will not be described in detail due to their minor character.

Relay valve 38A may be used in the safety system shown in FIG. 1 in place of valve 38, and its operation is substantially identical to the operation of valve 38. When valve 38A is in the open position, pilot pressure applied to port 52A enters piston chamber 46A and acts against pressure face 68A of piston 62A in order to maintain slide valve 60A in the open position. Cross port 106A is blanked off between O-rings 63A and 65A, and fluid pressure is applied through passage 104A to the visual indicator mechanism in knob 107A. The indicator thus displays the green color through lens 108 to indicate the open position of the relay valve.

When line 36 is bled to relieve the pressure of pilot port 52A, spring 66A moves slide valve 60A to the closed position of FIG. 6, wherein actuator fluid is bled off from port 56A to bleed port 54A through annular chamber 82A. Cross port 106A is located in enlarged bore portion 44A and is in direct fluid communication with bleed port 54A to assist in bleeding off fluid from passage 104A, thereby effecting the red condition of the visual indicator mechanism.

If the pressure at pilot port 52A should resume after having been interrupted, only the small area of piston face 68A within O-ring 59A is exposed to the pilot pressure. Consequently, a resumption of pilot pressure is not by itself effective to move slide valve 60A from the closed position to the open position. Even if the piston is unseated slightly from surface 70A due to vibration or other forces, any fluid pressure applied to piston chamber 46A is bled through passages 61A and 104A and out through cross port 106A and bleed port 54A. An additional safety feature is thus provided to assure automatic lockout of the relay valve.

FIGS. 7-9 illustrate a third embodiment of the relay valve which is generally designated by reference numeral 38B. For the most part, the third embodiment is similar to the second embodiment, and similar reference numerals followed by the letter "B" are employed in FIGS. 7-9 to identify components which are similar to the corresponding components in the second embodiment of the invention shown in FIGS. 5 and 6.

The third embodiment of the relay valve differs from the second embodiment in that O-rings 63A and 65A are eliminated and replaced by a single O-ring 71B which serves as a one-way check valve for the cross port 106B of fluid passage 104B. As best shown in FIG. 9, O-ring 71B is mounted in an annular groove 73B which is formed in slide valve 60B at a location to intersect with cross port 106B at the opposite or outer ends thereof. Groove 73B has a pair of spaced apart side walls 75B and 77B which are tapered in a manner to converge as they extend inwardly from the outer surface of slide valve 60B. Groove 73B has a base surface 79B which extends between side walls 75B and 77B at the inner ends thereof. The distance between side walls 75B and 77B is less than the diameter of O-ring 71B at the inner portion of groove 73B, while side walls 75B and 77B are spaced apart a greater distance than the diameter of O-ring 71B at the outer portion of groove 73B.

Relay valve 38B functions in essentially the same manner as the relay valves 38 and 38A described previously. When slide valve 60B is pulled outwardly to the open position thereof shown in FIG. 8, annular chamber 82B connects supply port 58B with actuator port 56B in order to direct fluid to the valve actuator. O-ring 71B fits closely in bore 42B to form a seal therein at a location between actuator port 56B and bleed port 54B. O-ring 71B is confined by the wall of bore 42B and is thereby held in tight sealing engagement with walls 75B and 77B of groove 73B. Fluid pressure applied to fluid passage 104B is unable to flow out through passage 106B due to the fluid-tight seal provided by O-ring 71B in the open position of the slide valve. Consequently, the fluid pressure applied to pilot port 52B builds up in piston chamber 46B to maintain slide valve 60B in open position, and the fluid pressure is also applied to passage 104B in order to maintain the visual indicator mounted in knob 107B in the green condition.

When the pressure applied to pilot port 52B is relieved, fluid is bled from piston chamber 46B to permit spring 66B to move slide valve 60B to the closed position of FIG. 7. Passage 104B is also bled of fluid such that the visual indicator in knob 107B displays the red condition indicating the closed position of the slide valve.

If pilot pressure should resume following interruption thereof, the small area of piston face 68B within O-ring 59B is the only portion of the piston exposed to the pilot pressure. Even if O-ring 59B or another seal element should leak or if piston 62B is unseated slightly from surface 70B, the fluid in piston chamber 46B will be bled into passage 104B through passageways 61B. The fluid is then bled through cross port 106B and is applied to O-ring 71B from the inside, which forces O-ring 71B outwardly in order to release its seal against side walls 75B and 77B of groove 73B. This permits the fluid to flow from port 106B past O-ring 71B and out through bleed port 54B. Automatic lockout of the relay is thus assured since any fluid applied to piston chamber 46B in the closed position of the slide valve will automatically bleed past O-ring 71B due to its unconfined condition in enlarged bore portion 44B when the relay is in the closed position of FIG. 7.

What is claimed is:

1. A valve for controlling fluid flow to and from an actuator in response to pressure changes in a pilot line, said valve comprising:

- a valve body presenting a longitudinal bore therein, said bore having an enlarged inner end portion defining a piston chamber in the valve body;
- a slide valve mounted in the bore for longitudinal movement between an open position for directing fluid to the actuator and a closed position for bleeding fluid from the actuator, said slide valve having an outer and extending outwardly of the valve body and adapted to be manually pulled to move the slide valve outwardly from the closed position to the open position for manual setting of the slide valve;
- means biasing the slide valve inwardly toward the closed position;

a pilot port in a side portion of the valve body adapted for connection with the pilot line to sense the fluid pressure therein;

a piston carried in said piston chamber on an inner end portion of said slide valve opposite said outer end thereof, said piston presenting an inwardly facing pressure face for receiving pressurized fluid from said pilot port to hold the slide valve in the open position against the force of said biasing means; and a fluid passage in the slide valve for directing fluid from said pilot port to said piston chamber for application to said pressure face of the piston, said passage extending to said pressure face of the piston and having an inlet port formed in a side portion of said slide valve at a location in fluid communication with said pilot port when said slide valve is in the open position, whereby pilot line pressure is applied from the pilot port through said inlet port and fluid passage to said piston chamber and against said pressure face of the piston to hold said slide valve in the open position when the pilot line pressure is sufficient to overcome the force of said biasing means.

2. A valve as set forth in claim 1, including:

a vent port formed in the valve body at a location in fluid communication with said bore on a side of said piston opposite the pressure face thereof; and means for sealing said inlet port from said vent port in the open position of the slide valve.

3. A valve as set forth in claim 2, wherein said inlet port and vent port are in fluid communication with one another in the closed position of the slide valve, thereby preventing buildup of fluid pressure in said piston chamber adjacent said pressure face of the piston when said slide valve is in the closed position.

4. A valve as set forth in claim 1, including:

a reduced diameter portion of said slide valve providing an annular chamber in fluid communication with said pilot port when said slide valve is in the open position, said inlet port being located in said reduced diameter portion; and a pair of seal elements forming spaced apart seals in said bore between the valve body and slide valve when the slide valve is in the open position, said seals being located on opposite sides of said annular chamber to provide a closed fluid path through said annular chamber between said pilot port and inlet port in the open position of the slide valve.

5. A valve as set forth in claim 4, including:

a first vent port in the valve body in fluid communication with said bore on a side of said piston opposite said pressure face thereof, one of said seal elements providing a seal in said bore at a location between said pilot port and first vent port in the closed position of the slide valve; and a second vent port in the valve body in fluid communication with said pilot port in the closed position of the slide valve.

6. A valve as set forth in claim 1, including:

visual indicator means on said outer end of the slide valve having a first condition indicating the open position of the slide valve and a second condition indicating the closed position of the slide valve;

means for effecting the first condition of said indicator means when said passage is exposed to fluid pressure above a predetermined level; and means for effecting the second condition of said indicator means when the pressure in said passage is below said predetermined level.

7. A valve as set forth in claim 1, including:

a supply port in said valve body for directing incoming fluid to said bore;

an outlet port in said valve body for receiving fluid from said bore for application to said actuator, said outlet port being located between said supply port and said piston chamber;

a bleed port in said valve body for exhausting fluid from said bore, said bleed port being located between said outlet port and said piston chamber;

a vent port in said valve body in fluid communication with said bore on a side of said piston opposite said pressure face thereof;

means for sealing said inlet port of the fluid passage from said vent port in the open position of the slide valve;

a reduced diameter portion of the slide valve providing an annular chamber in said bore extending between said outlet and bleed ports in the closed position of the slide valve and extending between said supply and outlet ports in the open position of the slide valve; and means providing a pair of fluid-tight seals in said bore between the slide valve and valve body at locations on opposite sides of said annular chamber.

8. A valve as set forth in claim 7, wherein said inlet port of the fluid passage and said vent port are in fluid communication in the closed position of the slide valve.

9. A valve for controlling fluid flow to and from an actuator in response to pressure changes in a pilot line, said valve comprising:

a valve body presenting a longitudinal bore therein, said bore having an enlarged inner end portion defining a piston chamber in the valve body;

a slide valve mounted in the bore for longitudinal movement between an open position for directing fluid to the actuator and a closed position for bleeding fluid from the actuator, said slide valve having an outer end extending outwardly of the valve body and adapted to be manually pulled to move the slide valve outwardly from the closed position to the open position for manual setting of the slide valve;

means biasing the slide valve inwardly toward the closed position;

a pilot port in the valve body adapted for connection with the pilot line to sense the fluid pressure therein, said pilot port communicating with said piston chamber in the open position of the slide valve;

a piston carried in said piston chamber on an inner end portion of said slide valve opposite said outer end thereof, said piston presenting an inwardly facing pressure face for receiving pressurized fluid from said pilot port to hold the slide valve in the open position;

an exhaust port in said valve body for exhausting fluid therefrom;

a fluid passage in said slide valve communicating with said piston chamber to receive fluid applied thereto;

a port of the fluid passage formed in a side portion of said slide valve and providing fluid communication between said fluid passage and exhaust port in the closed position of the slide valve, whereby fluid pressure applied to said pilot port when said slide valve is in the closed position is directed through said fluid passage and port thereof to said exhaust port for exhaustion from the valve body; and means for sealing said port of the fluid passage from said exhaust port in the open position of the slide valve to permit application of pilot line pressure to said piston for holding of the slide valve in the open position.

10. A valve as set forth in claim 9, wherein said sealing means comprises a pair of seal rings forming spaced apart seals in said bore between the slide valve and valve body at locations on opposite sides of said port of the fluid passage when said slide valve is in the open position.

11. A valve as set forth in claim 9, including:

a supply port in said valve body for directing fluid to said bore;

an outlet port in said valve body for directing fluid from said bore to said actuator; and a reduced diameter portion of said slide valve defining an annular chamber in said bore about said reduced diameter portion, said annular chamber providing fluid communication between said supply and outlet ports in the open position of the slide valve and between said outlet and exhaust ports in the closed position of the slide valve.

12. A valve as set forth in claim 9, including:

visual indicator means mounted on said outer end of the slide valve, said indicator means having a first condition indicating the open position of the slide valve and a second condition indicating the closed position of the slide valve;

means for effecting the first condition of said indicator means when said fluid passage is exposed to fluid pressure above a predetermined level; and means for effecting the second condition of said indicator means when the pressure in said fluid passage is below said predetermined level.

13. A valve as set forth in claim 9, wherein said sealing means includes a seal element closing said port of the fluid passage in the open position of the slide valve, said seal element permitting fluid flow in a direction out of the passage through said port thereof in the closed position of the slide valve.

14. A valve as set forth in claim 9, wherein said sealing means includes:

a seal element adjacent said port of the fluid passage, said seal element being movable in response to fluid pressure applied to said port from the fluid passage to a position wherein fluid flow is permitted through said port from said fluid passage when said slide valve is in the closed position; and means for maintaining said seal element in a sealing position to block fluid flow from said passage through said port thereof in the open position of the slide valve.

15. A valve as set forth in claim 9, wherein said sealing means includes:

an annular groove in said slide valve connecting with said port of the fluid passage, said groove having tapered sides which converge inwardly toward said port;

a seal ring in said groove having a confined condition sealing against said tapered sides of the groove to prevent flow through said port of the fluid passage, said seal ring having an unconfined condition wherein fluid flow is permitted between said seal ring and tapered sides in a direction from said fluid passage through said port thereof; and means for maintaining said seal ring in the confined condition in the open position of the slide valve and in the unconfined condition in the closed position of the slide valve.

* * * * *